United States Patent [19]

Rabehl

[11] 4,036,320
[45] July 19, 1977

[54] LUBRICATION DEVICE FOR SNOWMOBILE SLIDERAIL

[75] Inventor: Kenneth R. Rabehl, Beaver Dam, Wis.

[73] Assignee: James T. Murray, Beaver Dam, Wis. ; a part interest

[21] Appl. No.: 549,456

[22] Filed: Feb. 12, 1975

[51] Int. Cl.² .............................................. B62D 55/00
[52] U.S. Cl. ...................................... 180/5 R; 280/28; 305/14
[58] Field of Search ........................ 305/11, 12, 13, 14; 180/5 R; 280/28, 28.5

[56] References Cited

U.S. PATENT DOCUMENTS

| | | | |
|---|---|---|---|
| 1,992,702 | 2/1935 | Koop | 305/12 |
| 2,780,500 | 2/1957 | Lawson | 305/12 |
| 3,897,839 | 8/1975 | Brisebois | 180/5 R |

Primary Examiner—Robert R. Song
Assistant Examiner—John A. Carroll
Attorney, Agent, or Firm—John M. Diehl

[57] ABSTRACT

Device attachable to snowmobiles and other ice and snow vehicles which comprise an endless track or belt and a slide rail. The device engages ice, snow or water on the surface alongside the vehicle and throws or directs such aqueous material against the slide rail and portions of the belt adjacent the slide rail to lubricate the interface between the slide rail and belt.

7 Claims, 25 Drawing Figures

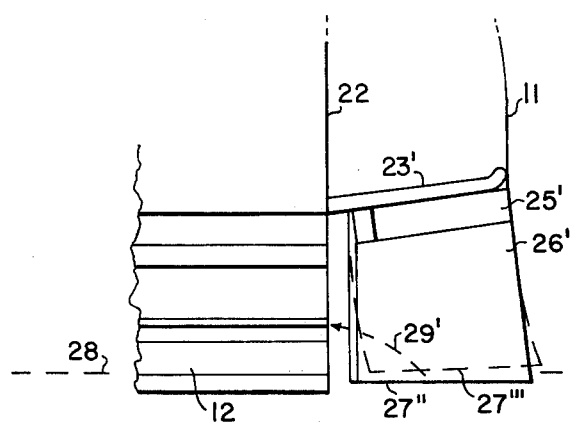
Fig. 4.
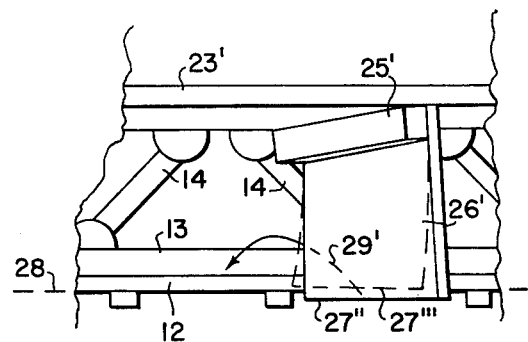
Fig. 5.
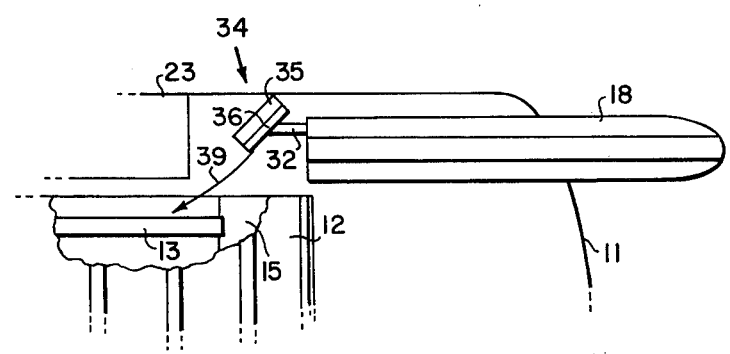
Fig. 6.
Fig. 7.
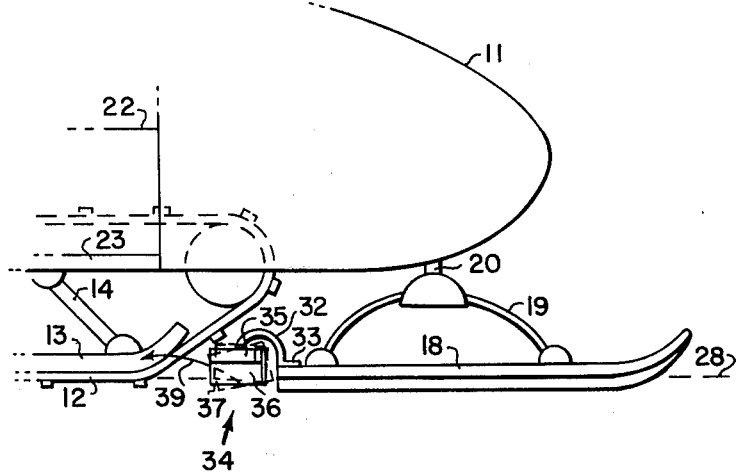
Fig. 8.
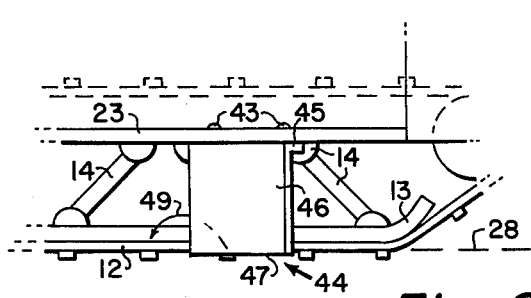
Fig. 9.

LUBRICATION DEVICE FOR SNOWMOBILE SLIDERAIL

FIELD

This invention relates to a lubrication device for tracks of snowmobiles or other ice or snow vehicles.

PRIOR ART AND SUMMARY

Many vehicles which are provided for travel on ice or snow, including many snowmobiles, research and freight vehicles for use in arctic regions, vehicles for pulling snow grooming equipment on ski hills and the like, are provided with endless belt means, normally referred to as tracks, which support the vehicles on the snow or ice. Such a track serves as a principal driving member when driven from an engine through any suitable power transmission means, to drive the vehicle forward. Two principal types of mechanisms are presently used to engage inside portions of the track to support such a vehicle from its track or tracks and to attach track and vehicle together: either bogie wheels or slide rails are attached to the vehicle. These contact the lower run of the track which rests on the surface on which the vehicle is operated. Supplementary bogie or idler wheels are provided in some vehicles having slide rails.

When snowmobiles or other snow or ice vehicles travel on relatively snowy surfaces, the action of the tracks and of the skis usually provided with such vehicles, together with the air turbulence provided by the vehicle's passage, normally suffice to direct substantial quantities of snow or ice crystals to the slide rails and the portions of the belts contacted by the slide rails, thereby lubricating the slide bearing between the slide rails and the tracks. Vehicles in which bogie wheels are utilized function satisfactorily for extended periods on surfaces devoid of snow or ice crystals and also sometimes function in a normal manner when lubricated only by the moisture present in the surroundings. However, on the other hand, slide rails of vehicles in which slide rails are used in place of bogie wheels become heated and deteriorate rapidly under these conditions. Slide rails and in some cases portions of the belts in contact with the slide rails may burn up or burn out in only a few miles of unlubricated travel under these conditions.

The present invention provides means which engage (scoop up) ice crystals, water, or snow from surfaces otherwise too dry to provide lubrication and direct the snow, ice or water thus engaged into the slide rail area to thereby effectively lubricate the slide bearing and prevent such deterioration.

No previous disclosure of any such device is known. U.S. Pat. No. 3,809,442 describes the use of a self-lubricating material for the slide rails or self-lubricating buttons attached to the endless belt in positions to contact the slide rails wherein the self-lubricating material consists of a polymeric material impregnated with a lubricant such as wax of molybdenum disulphide, to solve this problem.

U.S. Pat. No. 3,815,960 describes providing a hollow perforated slide rail filled with liquefiable lubricant.

U.S. Pat. Nos. 3,671,051 and 3,820,858 each describe means for delivering liquid lubricant from a reservoir to the slide bearing provided by the slide rail and the endless belt.

U.S. Pat. Nos. 3,074,499 and 3,074,764 describe the use of air as a lubricant which is pumped into a space provided between a slide rail type member and an endless belt or track.

Clearly none of these proposed lubricating devices or systems provide material as a lubricant which has as its formula $H_2O$ and none provide means for engaging with or scooping snow, ice or water from alongside the vehicle and directing such snow or ice to the slide rail bearing area to provide lubrication of the slide rail bearing, that is, the bearing provided by the slide rail and the endless belt portions engaged with the slide rail.

Advantages

Generally speaking snowmobiles and other ice and snow vehicles even when used on relatively non-snowy surfaces, are used substantially entirely on surfaces where at least a little moisture is present, usually in the forms of a light snow covering resulting from flurries or a light residual snow covering or water or snow on the ice of a frozen lake or even water from melting snow remaining on vegetation in woods or fields.

None of the heretofore proposed devices utilize this naturally occurring and naturally present material as a lubricant under such relatively snowless conditions.

Under these conditions the natural lubricant utilized in the device of the invention is always present whereas the lubricant of the reservoir type device as described above must be replenished from time to time. The lubricant of the impregnated devices is, of course, exhausted in time and a device utilizing air as a lubricant requires a disproportionately greater amount of power to provide lubrication than does the device described herein.

Objects

It is therefore an object of the invention to provide improved means for lubricating the slide rail bearings of snowmobiles and other ice and snow vehicles in which slide rails are utilized.

Another object is means to utilize naturally occurring ice, snow and water for such lubrication under circumstances where slide rail bearings of such vehicles would normally not be lubricated.

Other objects will become apparent from the drawings and from the following detailed description.

DRAWINGS

In the drawings, like reference numerals refer to like parts and:

FIG. 4 is a fragmentary rear elevation of a modification of the embodiment of FIGS. 1–3;

FIG. 5 is a fragmentary side elevation of the embodiment of FIG. 4;

FIG. 6 is a fragmentary side elevation of an embodiment wherein members in accordance with the invention are attached to snowmobile skis;

FIG. 7 is a fragmentary partially cutaway view from below of the bottom of the embodiment of FIG. 6;

FIG. 8 is a fragmentary side elevation of a modification of the embodiment of FIGS. 1–3;

FIG. 9 is a fragmentary partially cutaway view from below of the bottom of the embodiment of FIG. 8;

DESCRIPTION

Figure 1:
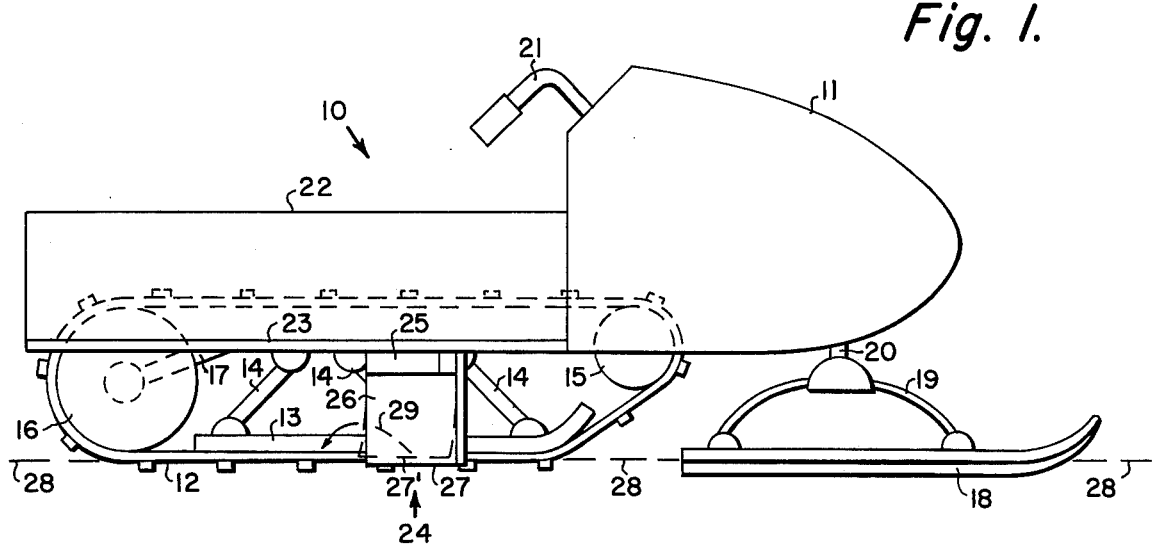
FIG. 1 is a schematic side elevation of a snowmobile having one embodiment of the invention applied thereto.
Figure 2:
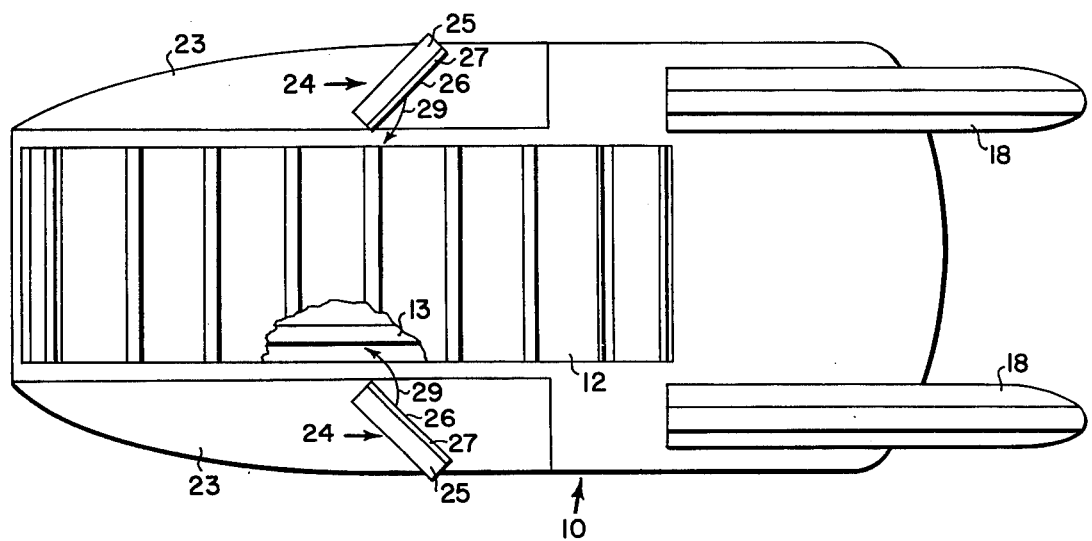
FIG. 2 is a view from underneath of the bottom of the embodiment of FIG. 1, partially cutaway.
Figure 3:
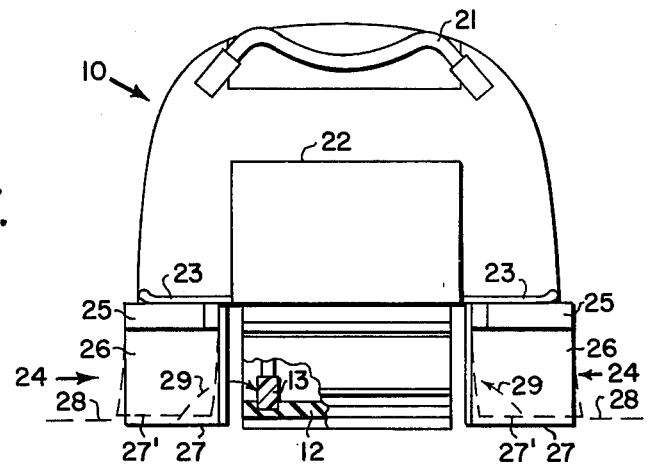
FIG. 3 is a rear elevation, partially cutaway, of the embodiment of FIGS 1 and 2.

Referring now to FIGS. 1, 2 and 3, a snowmobile indicated generally as 10 is shown schematically, for simplicity, rather than in complete detail. Snowmobile 10 may comprise a front or hood portion 11 which may contain an engine (not shown for simplicity) which by means also not shown for simplicity may drive an endless belt 12, often referred to as a track. Engaged with belt 12 and supporting a portion of snowmobile 10 there may be provided slide rails 13 which may be attached to vehicle 10 by suspension means indicated schematically as 14. Belt 12 may be trained over forward rotating means 15 which may be attached to vehicle 10 by means not shown for simplicity and may be trained over rear rotating means 16 which may be attached to vehicle 10 by means indicated schematically as 17. Skis 18 may be provided which may be attached by spring members 19 to rotatable upwardly extending shafts 20 which may be rotated with means not shown for simplicity by steering handle or handlebar 21 to steer the vehicle. Seat or rear portion 22 may be provided overlying belt 12 and having foot rests or running boards 23 extending outwardly therefrom. Attached to the underside of each of running boards 23 there may be provided a device in accordance with the invention, indicated generally as 24, which may comprise a block 25 attached to the running board by any suitable means, such as screws, welding or adhesive, having rubber flap 26 extending downwardly therefrom and being of such length that its bottom edge indicated at 27 extends slightly below the level indicated at 28 of the surface on which the vehicle travels. Each of flaps 26 may be disposed at an angle to the direction of forward travel of the vehicle, as shown. In operation flaps 26 may be forced slightly rearwardly to the position indicated in dashed lines at 27' by reason of engaging aqueous material (ice, snow or water) on surface 28 and causing the material thus engaged to be projected inwardly as indicated by arrows 29 into contact with slide rails 13 and the interior portions of belt 12 which are in contact with slide rails 13.

Referring now to FIGS. 4 and 5, there is shown a modification of the embodiment of FIGS. 1-3 wherein running boards 23' extend slightly upward instead of extending directly outward as do running boards 23. Blocks 25' are fastened thereto in the same manner as blocks 25 and elastomeric flaps 26' which may be of synthetic rubber or flexible synthetic resinous polymeric material are slightly different in shape so that their bottom edges 27" when at rest extend below the level of surface 28 on which the vehicle travels and when in operation are forced slightly backwardly as indicated at 27'" in dashed lines when engaging snow, ice or water on the surface and causing such snow, ice or water (aqueous material) to be projected as indicated by arrows 29' against slide rails 13 and portions of belt 12 which are in contact with slide rails 13 to thereby lubricate the slide bearings between these parts.

Referring now to FIGS. 6 and 7, a device in accordance with the invention indicated generally as 34 may be attached to the rear of each of skis 18. Each of devices 34 may comprise a spring member 32 attached to the skis by any suitable means such as screws, welding or adhesive as indicated at 33. Attached to spring member 32 there may be provided a support member 35 having blade 36 extending downwardly therefrom so that its lower edge 37 is normally below the level 28 of the surface on which the vehicle travels.

When in operation blade 36 may travel up and down as indicated by dashed lines 36', by reason of the spring action of spring member 32, to conform to irregularities in surface 28 and may engage snow, ice or water on surface 28 and project such snow, ice or water (aqueous material) as indicated by arrows 39 into contact with slide rails 13 and portions of belt 12 adjacent slide rails 13 to provide lubrication between belt 12 and slide rails 13.

It may be noted that devices 34 must be located sufficiently close to the ends of skis 18 that they do not interfere with track 12 when the skis are turned. It may also be noted that when the skis are in a turned position the lubrication afforded by the embodiment of FIGS. 6 and 7 may be ineffective but it is not normally necessary to provide lubrication at all times and it is generally sufficient if lubrication is provided during those periods when the vehicle is travelling straight forward and the skis are in a normal unturned postion.

Referring now to FIGS. 8 and 9, a device in accordance with the invention, indicated generally as 44, may comprise a single metal member or plastic member bent or molded to provide a web 46 and a flange 45. Web 46 may constitute a blade extending below the level 28 of the surface on which the vehicle travels, as indicated at 47. Flange portion 45 may provide means to attach the device as with bolts 43 to the underside of running board 23.

In operation, lower edges 47 engage snow, ice or water on the surface 28 and project such aqueous material into the area of slide rails 13 and parts of belt 12 contacted by slide rails 13 to lubricate the slide rail bearings. Blades 46 may flex rearwardly to some extent in a manner not shown for simplicity. This embodiment may be particularly suitable in embodiments wherein suspension 14 is relatively stiff and provides little flexure so that the distance between the lower run of belt 12 and running board 23 changes relatively little.

The particular angle at which device 44 or any other device described herein is mounted may vary greatly. Thus the angle of blade 46 may be as shown in full lines. Alternatively the blade may be somewhat more nearly parallel to the forward direction of the vehicle as indicated in dashed lines at 46' or may be more nearly transverse to the vehicle as indicated in dashed lines at 46". The same is true for other blades described herein such as blades 26, 36, 56, 66, 76, 86, 96, 136 and 146.

Figure 10:
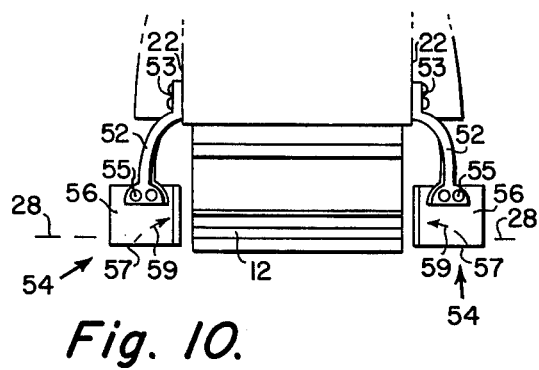
FIG. 10 is a fragmentary rear elevation of another embodiment.

As shown in FIG. 10, the invention may be applied to an ice or snow vehicle which has no running boards. Thus, devices in accordance with the invention which are indicated generally as 54 may comprise blades 56 attached at 55 by such means as bolts or rivets to spring members 52 which may be attached at 53 to sides 22 of the vehicle by such means as studs, as shown. Blades 56 may extend downwardly so that the lower edges 57 thereof extend below the level 28 of the surface on which the vehicle travels and engage ice, snow or water on the surface and project such aqueous material, as indicated by arrows 59, into the slide rail bearing areas to lubricate the slide rail bearings.

Figure 11:
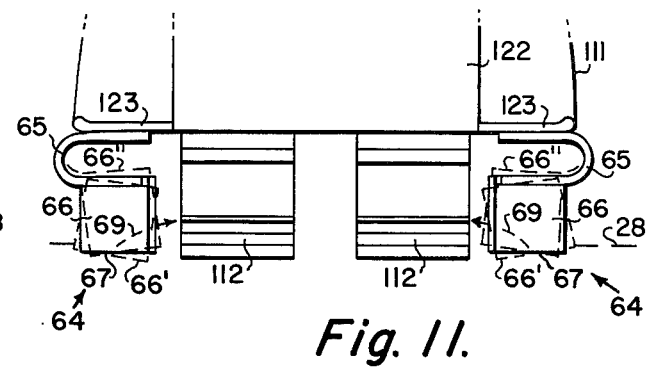
FIG. 11 is a fragmentary rear elevation of another embodiment.
Figure 12:
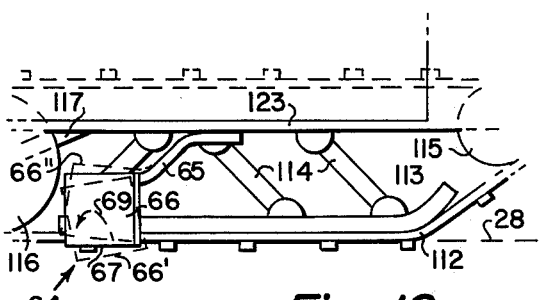
FIG. 12 is a fragmentary side elevation of the embodiment of FIG. 11.
Figure 13:
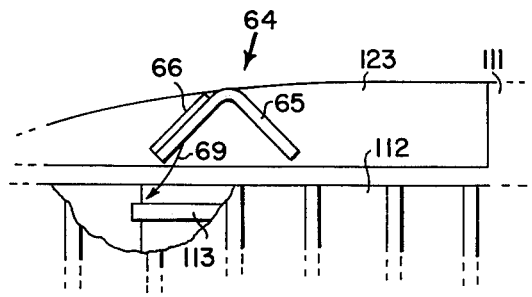
FIG. 13 is a fragmentary partially cutaway view from below of the bottom of the embodiment of FIGS. 11 and 12.

Now referring to FIGS. 11, 12 and 13 there is shown a snow vehicle comprising front portion 111, rear or seat portion 122, and running boards 123 which instead of being provided with only a single track, as described for embodiments hereinbefore described, is provided with two tracks 112. Each of tracks or belts 112 may be provided with two slide rails 113 and may be trained over forward and rear rotating members, respectively 115 and 116, the latter being supported by schematically-shown members 117 and slide rails 113 being supported by suspension members 114 corresponding to members 14. Devices in accordance with the invention indicated generally as 64 may be attached thereto.

All of the hereinbefore described embodiments and hereinafter described embodiments may be provided on a slide rail supported snow or ice vehicle having two tracks or more (some have four tracks and some may have three tracks). Likewise, device 64 may equally well be applied to vehicles having only a single track or belt.

Devices 64 may comprise blade members 66 attached to the undersides of running boards 123 by spring members 65. Attachment of spring members 65 to running boards 123 and blades 66 may be by any suitable means such as welding, adhesive, bolts, rivets or the like. Blades 66 may have lower edges 67 which extend below the level 28 of the surface on which the vehicle operates and may accommodate themselves to the surface of varying terrain by the action of spring members 65 which allows them to occupy various downwardly and upwardly displaced positions as indicated in dashed lines respectively at 66' and 66".

In operation, edges 67 of blades 66 engage with snow, ice or water on surface 28 when the vehicle is moving forwardly and cause such snow, ice or water to be directed as indicated by arrows 69 to the area of slide rails 113 and portions of belts 112 which contact slide rails 113 to lubricate the slide rails and the belt portions contacted by the slide rails.

Figure 14:
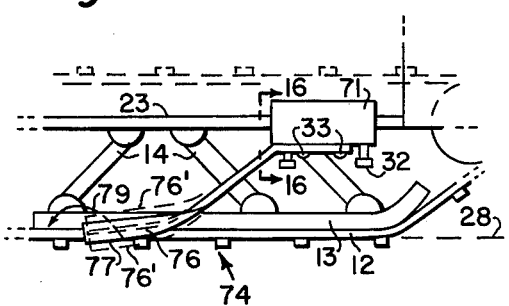
FIG. 14 is a fragmentary side elevation of another embodiment.
Figure 15:
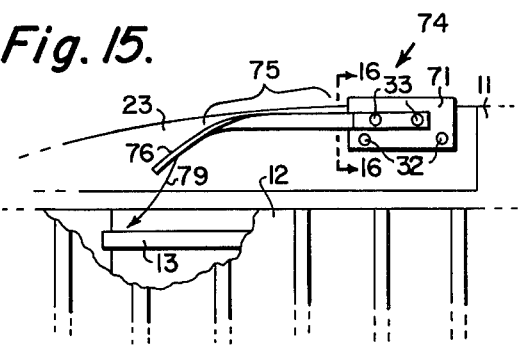
FIG. 15 is a fragmentary partially cutaway view from below of the embodiment of FIG. 14.

Now referring to FIGS. 14 and 15, there is shown an embodiment indicated generally as 74 wherein a single member 76 provides both a blade portion having a lower edge 77 which extends below the level 28 of the surface on which the vehicle normally travels and a spring portion 75 which provides for upward and downward movement of the blade portion as indicated at 76' in dashed lines. Member 76 may be attached as with bolts 33 to a clamp member 71 which may be clamped with suitable means such as studs 32 to running board 23. In operation lower edge 77 of blade member 76 engages with snow, ice or water on surface 28 and projects such aqueous material into contact with slide rail 13 and/or portions of track 12 which engage slide rail 13 to lubricate the slide rail bearing as indicated by arrows 79.

Figure 18:
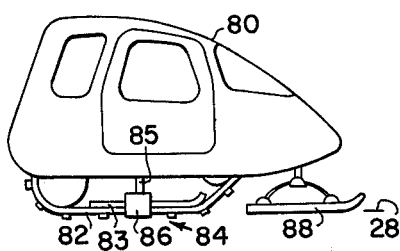
FIG. 18 is a side elevation of the embodiment of Fig. 17.
Figure 16:
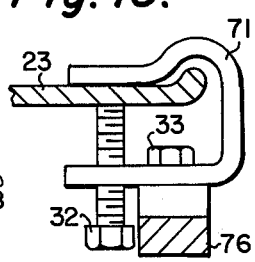
FIG. 16 is a cross-sectional view taken on lines 16—16 in FIGS. 14 and 15.
Figure 17:
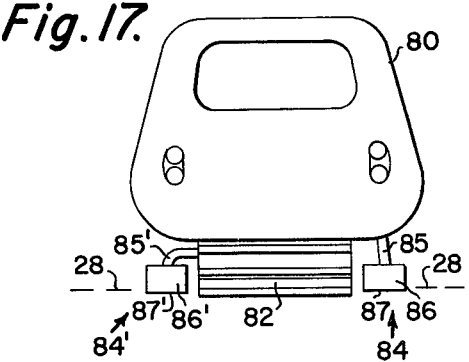
FIG. 17 is a rear elevation of a snow vehicle incorporating two other embodiments.

In FIGS. 17 and 18 there is shown an enclosed snow vehicle 80 provided with track 82, slide rails 83 and skis 88. A device in accordance with the invention may be attached underneath the vehicle either as indicated for embodiment 84 on one side of vehicle 80 or for embodiment 84' as indicated on the other side of vehicle 80. Embodiment 84 may comprise blade 86, having lower edge 87 extending below level 28 of the surface on which the vehicle normally travels, attached to the underside of vehicle 80 by member 85. Embodiment 84' may comprise blade 86' having lower edge 87' extending in the manner of lower edge 87 and attached by member 85' underneath the vehicle, in this case to a portion of the suspension not shown for simplicity. In use, lower edges 87 and 87' of blades 86 and 86' engage and direct ice, snow or water on surface 28 into contact with slide rails 83 and portions of track 82 which contact slide rails 83 to lubricate points of friction between the slide rails and the portions of track engaged by the slide rails.

Figure 19:
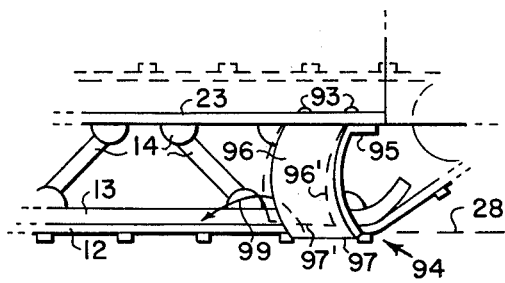
FIG. 19 is a fragmentary side elevation of another embodiment.
Figure 20:
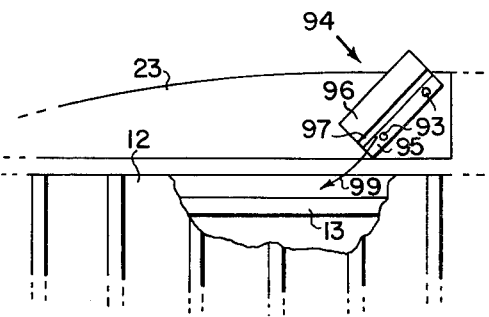
FIG. 20 is a fragmentary partially cutaway view from below of the bottom of the embodiment of FIG. 19.

It may be seen in FIGS. 11, 12 and 13 that the blades of the devices of the invention may be disposed relatively rearwardly with respect to the vehicle whereas other embodiments have shown blades of the devices of the invention located relatively forwardly with respect to the vehicle and in particular blades 36 of devices 34 shown in FIGS. 6 and 7 and blades 96 of devices 94 shown in FIGS. 19 and 20 are shown as located most forwardly. All of the embodiments described herein (with the exception of devices 34) may if desired be mounted as rearwardly as devices 64 or as forwardly as devices 94.

Referring now to the embodiment of FIGS. 19 and 20, devices 94 in accordance with the invention may comprise blades 96 which may have a bent a molded portion 95 which may be attached by any suitable means such as bolts 93 to running board 23 to mount blades 96 in the desired position shown.

Whereas all embodiments hereinbefore described have been provided with substantially flat blades, each of blades 96 is curved with respect to a vertical plane so that each has the form of a scoop. Thus, lower edges of blades 97 may not merely engage ice, snow or water on surface 28 on which the vehicle normally travels to project same as indicated by arrows 99 to the area of slide rails 13 and portions of tracks 12 adjacent to slide rails 13 but they may be said to scoop such ice, snow and water from surface 28 and thus direct the same as indicated by arrows 99. Scoop members 96 may in themselves provide sufficient spring action to adjust to varying terrain as indicated by dashed lines 96' and 97'.

Embodiments 94 of FIGS. 19 and 20 in contradistinction to other embodiments may be located relatively far forwardly.

Figure 21:
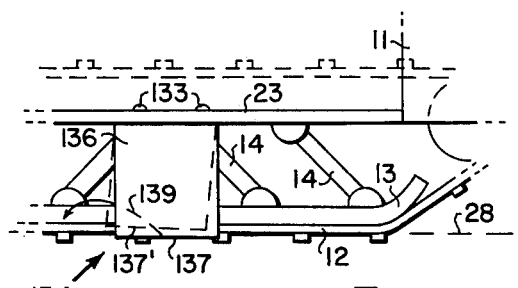
FIG. 21 is a fragmentary side elevation of another embodiment.
Figure 22:
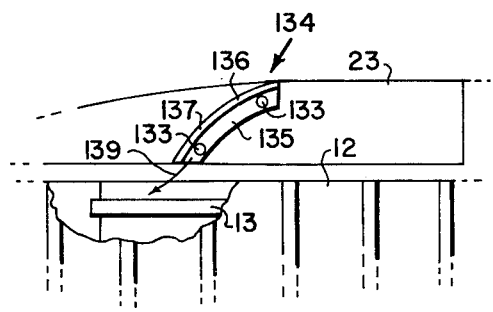
FIG. 22 is a fragmentary partially cutaway view from below of the bottom of the embodiment of FIG. 21.

Whereas each of blades 96 may be curved with respect to a vertical plane to provide scoop-like members and other embodiments hereinabove described have been provided with flat blades, blades 136 of embodiments 134 (FIGS. 21 and 22) may be provided which are each curved in the opposite direction with respect to a vertical plane than are blades 96. They may also be said to be scoops or scoop-like members to engage ice, snow or water on surface 28 on which the vehicle normally travels to direct same as indicated by arrows 139 into the area of slide rails 13 and portions of track 12 contacted by slide rails 13. Members 136 may be provided with a laterally extending portion at their top edge indicated as 135 which may be utilized to attach blades 136 to running boards 23 by such means as bolts 133.

Lower edges 137 of blades 136 may, if blades 136 are provided of flexible material, be deflected by contact with surface 28 or material thereon into the position shown in dashed lines at 137'.

Figure 23:
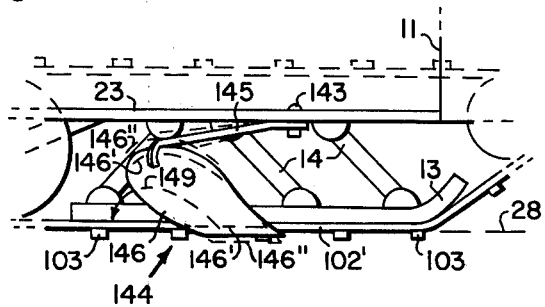
FIG. 23 is a fragmentary side view of another embodiment.
Figure 24:
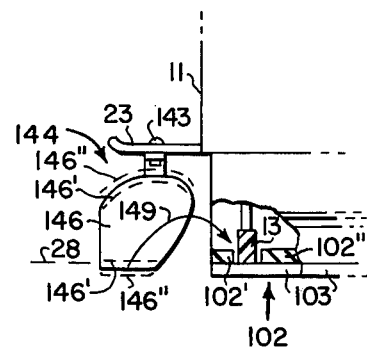
FIG. 24 is a fragmentary partially cutaway front elevation of the embodiment of FIG. 23.
Figure 25:
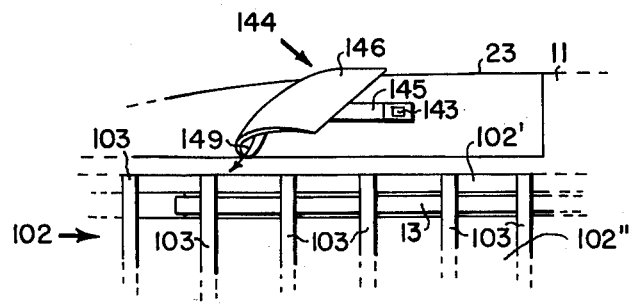
FIG. 25 is a fragmentary partially cutaway view from below of the bottom of the embodiment of FIGS. 23 and 24.

Referring now to FIGS. 23, 24 and 25 there is shown an embodiment 144 wherein blades 146 which may be attached to spring members 145 which in turn may be attached to running boards 23 by any suitable fastening means such as 143 have the shape of plow blades which extend slightly below the surface 28 on which the vehicle normally travels to plow ice, snow or water from surface 28 and direct such aqueous material as shown by arrows 149 to the areas of slide rails 13 to thereby lubricate those points at which slide rails 13 contact belt or track 102.

Whereas in other embodiments track 12 has been generally shown as consisting of a single endless belt of elastomeric material provided with cleats which have not been numbered, it is well known also to provide tracks such as tracks 102 wherein a plurality of independent endless strips of elastomeric material such as strips 102' and 102" are attached to metal, usually steel, cleats 103, and slide rails 13 ride on portions of cleats 103 disposed between strips 102' and 102".

Not just the embodiment of FIGS. 23, 24 and 25 is suitable for use with such tracks but all of the other hereinbefore described embodiments are suitable for use with such tracks.

Spring members 145 may provide for up and down movement of blades 146 with respect to running boards 23 as indicated in dashed lines at 146' and 146", in response to varying terrain and the action of suspension 14 in changing the distance between running boards 23 and the lower run of belt 102.

As may be seen from the foregoing description, in accordance with the invention slide rail bearings of vehicles which incorporate such bearings are lubricated during forward motion of the vehicle. Such lubrication is accomplished by providing members associated with the vehicles and interposing such members against aqueous material (ice, snow and/or water) on the surfaces alongside the vehicles. As described above, such interposition is accomplished without substantial motion of the members with respect to the vehicles except for motions required to accommodate the members to varying terrain and to the action of the vehicle suspension systems. The members, by reason of their forward motion and their positioning with respect to the vehicles and to aqueous material on surfaces on which the vehicles travel, direct such aqueous material to the slide rail bearing areas of the vehicles to lubricate the slide rail bearings.

It will be apparent to those skilled in the art that equivalents may be utilized.

Accordingly, the present invention may be embodied in other specific forms without departing from the spirit or essential attributes thereof, and accordingly, reference should be made to the appended claims rather than to the foregoing specification as indicating the scope of the invention.

It is claimed.

1. In a vehicle comprising an endless belt support means for supporting and driving the vehicle on ice and snow surfaces and comprising slide rail means slidingly engaged with portions of said belt means to support the body of said vehicle from said belt means, the combination with said vehicle of:

means attached to portions of the body of said vehicle to engage a portion of said surfaces alongside said belt means and said slide rail means and deflect said portion of said surfaces into engagement with said slide rail means and said belt means engaged by said slide rail means.

2. The device of claim 1 wherein said vehicle comprises running boards, each of which has an upperside, an underside and an edge, each of said running boards being a foot support member attached to said vehicle in a position spaced apart from said ice and snow surfaces, and said means attached to said vehicle to engage a portion of said surfaces comprises a flexible member attached to each running board.

3. The device of claim 2 wherein said flexible member is metal.

4. The device of claim 2 wherein said flexible member comprises polymeric material.

5. The device of claim 2 wherein said flexible member is attached to the underside of said running board.

6. The device of claim 1 wherein each of said members attached to said vehicle to engage a portion of said surfaces is attached to said vehicle underneath said vehicle.

7. The method of lubricating a slide rail bearing in a vehicle comprising a slide rail bearing and an endless track which comprises:

during forward motion of said vehicle, interposing a member alongside said endless track and attached to the body of said vehicle against aqueous material on the surface alongside said endless track of said vehicle and without substantial motion of the member except to accommodate varying terrain and the motion of the vehicle suspension system of the vehicle, directing such material to the slide rail bearing area of the vehicle to lubricate said slide rail bearing.

* * * * *